United States Patent
Omori et al.

(10) Patent No.: US 9,602,695 B2
(45) Date of Patent: Mar. 21, 2017

(54) IMAGE TYPE BASED DATA TRANSMISSION (71) Applicant: PFU LIMITED, Kahoku-shi, Ishikawa (JP)

(72) Inventors: Yasuo Omori, Kahoku (JP); Hisashi Yanagisawa, Kahoku (JP)

(73) Assignee: PFU LIMITED, Kahoku-shi (JP)

( * ) Notice: Subject to any disclaimer, the term of this patent is extended or adjusted under 35 U.S.C. 154(b) by 0 days.

(21) Appl. No.: 14/713,883

(22) Filed: May 15, 2015

(65) Prior Publication Data

US 2016/0227073 A1    Aug. 4, 2016

(30) Foreign Application Priority Data

Jan. 30, 2015  (JP) ................................ 2015-017381

(51) Int. Cl.
G06K 15/00    (2006.01)
G06F 3/12     (2006.01)
(Continued)

(52) U.S. Cl.
CPC ....... *H04N 1/4426* (2013.01); *H04N 1/00244* (2013.01); *H04N 1/00854* (2013.01);
(Continued)

(58) Field of Classification Search
CPC ............. H04N 1/4426; H04N 1/00244; H04N 1/00854; H04N 1/00925; H04N 1/444; G06K 15/4095
(Continued)

(56) References Cited

U.S. PATENT DOCUMENTS

2012/0098978 A1   4/2012  Yasuda
2012/0287469 A1*  11/2012 Tomiyasu .......... H04N 1/00244
                                                      358/1.15
(Continued)

FOREIGN PATENT DOCUMENTS

JP    2012-090150 A    5/2012
JP    2013-168803 A    8/2013
(Continued)

OTHER PUBLICATIONS

Notice of Reason for Rejection dated Mar. 15, 2016, issued in counterpart Japanese Patent Application No. 2015-017381, with English translation. (10 pages).

(Continued)

*Primary Examiner* — Benny Q Tieu
*Assistant Examiner* — Juan M Guillermety
(74) *Attorney, Agent, or Firm* — Westerman, Hattori, Daniels & Adrian, LLP (57) ABSTRACT

Provided is an image data processing server including: a user authenticating unit that authenticates a user of an imaging device; a permission acquiring unit that acquires access permission to a user account of a predetermined service; an image receiving unit that receives image data which is transmitted from the imaging device; a type determining unit that determines a type of the image data; and a data transmitting unit that transmits data to the user account of the predetermined service when the image data is determined to be image data of a predetermined type.

11 Claims, 6 Drawing Sheets

(51) Int. Cl.
  *H04N 1/44* (2006.01)
  *H04N 1/00* (2006.01)
(52) U.S. Cl.
  CPC ......... *H04N 1/00925* (2013.01); *H04N 1/444* (2013.01); *H04N 2201/0081* (2013.01)
(58) Field of Classification Search
  USPC .............................................. 358/1.14, 1.15
  See application file for complete search history.

(56) References Cited

U.S. PATENT DOCUMENTS

| | | | |
|---|---|---|---|
| 2014/0002863 A1 | 1/2014 | Hasegawa et al. | |
| 2014/0198336 A1* | 7/2014 | Numata | H04N 1/4426 358/1.14 |
| 2014/0253957 A1* | 9/2014 | Tye | H04N 1/00244 358/1.15 |
| 2014/0376037 A1* | 12/2014 | Onogi | G06F 3/1238 358/1.15 |
| 2015/0154484 A1* | 6/2015 | Iwasaki | G06K 15/4095 358/1.14 |
| 2015/0201091 A1* | 7/2015 | Yokoyama | H04N 1/00307 358/1.15 |
| 2015/0254350 A1* | 9/2015 | Lightner | G06F 17/30256 707/706 |
| 2015/0281496 A1* | 10/2015 | Yamamoto | H04N 1/00925 358/448 |

FOREIGN PATENT DOCUMENTS

| | | |
|---|---|---|
| JP | 2013-207449 A | 10/2013 |
| JP | 2014-11698 A | 1/2014 |
| JP | 2014-197820 A | 10/2014 |

OTHER PUBLICATIONS

Final Decision of Rejection dated Sep. 27, 2016, issued in counterpart Japanese Patent Application No. 2015-017381, with English translation. (7 pages).

\* cited by examiner

IMAGE TYPE BASED DATA TRANSMISSION

CROSS-REFERENCE TO RELATED APPLICATION

This application is based upon and claims the benefit of priority of the prior Japanese Patent Application No. JP2015-017381, filed on Jan. 30, 2015, the entire contents of which are incorporated herein by reference.

FIELD

The present disclosure relates to a technique for processing image data.

BACKGROUND

In a conventionally proposed technique, an information processing device which is capable of communicating with a transmitting device that transmits data and a storage device that stores data and which provides a cloud service receives data transmitted from the transmitting device, transmits data with a same capacity as the received data to the storage device, performs processing of the cloud service on the received data, and transmits, together with processed data, an instruction to update data with the same capacity using the processed data, to the storage device (refer to Japanese Patent Application Publication No. 2013-168803).

In addition, an image reading device is proposed in which analog data that is output by each imaging element in an image sensor having read an image is converted into digital data and uncompressed data is generated, a margin pattern included in the image is detected based on the generated uncompressed data, a document type of the image is identified based on the detected margin pattern, the generated uncompressed data is developed to generate image data, document type data is attached to the generated image data, and the image data is output to a server. (Refer to Japanese Patent Application Publication No. 2013-207449).

SUMMARY

An example of the present disclosure is an image data processing server including: user authenticating means for authenticating a user of an imaging device; permission acquiring means for acquiring, from a predetermined service that provides the service via a network, access permission to an account of the user in the predetermined service; image receiving means for receiving, via a network, image data which is transmitted from and acquired by the user-authenticated imaging device; type determining means for determining a type of the received image data; and data transmitting means for transmitting, when it is determined by the type determining means that the image data is image data of a predetermined type, the image data or data generated based on the image data to the account of the user in the predetermined service, using the access permission acquired from the predetermined service with respect to a user who has been authenticated as the user of the imaging device that has transmitted the image data.

The present disclosure may be viewed as an information processing device, a system, a method that is executed by a computer, and a program to be executed by a computer.

In addition, the present disclosure may be viewed as a recording of such a program on a recording medium that is readable by a device such as a computer, a machine, or the like.

In this case, a recording medium that is readable by a computer or the like refers to a recording medium which stores information such as data and programs by an electric action, a magnetic action, an optical action, a mechanical action, or a chemical action and which can be read by a computer or the like.

DESCRIPTION OF EMBODIMENTS

Hereinafter, an embodiment of an image data processing server, a system, a method, and a program according to the present disclosure will be described with reference to the drawings.

It should be noted that the embodiment described below merely exemplifies the present disclosure and is not intended to limit an image data processing server, a system, a method, and a program according to the present disclosure to the specific configurations described below. When implementing the present disclosure, a specific configuration may be adopted as appropriate in accordance with each embodiment. In addition, various improvements and modification may be made to the present disclosure.

As the present embodiment, an embodiment in which an image data processing server, a system, a method, and a program according to the present disclosure are implemented in a system that is interlocked with a scanner will be described. However, an image data processing server, a system, a method, and a program according to the present disclosure can be widely used with respect to techniques for processing image data acquired by an imaging device. Accordingly, objects of application of the present disclosure are not limited to the examples described in the present embodiment.

<Configuration of System>

Figure 1:
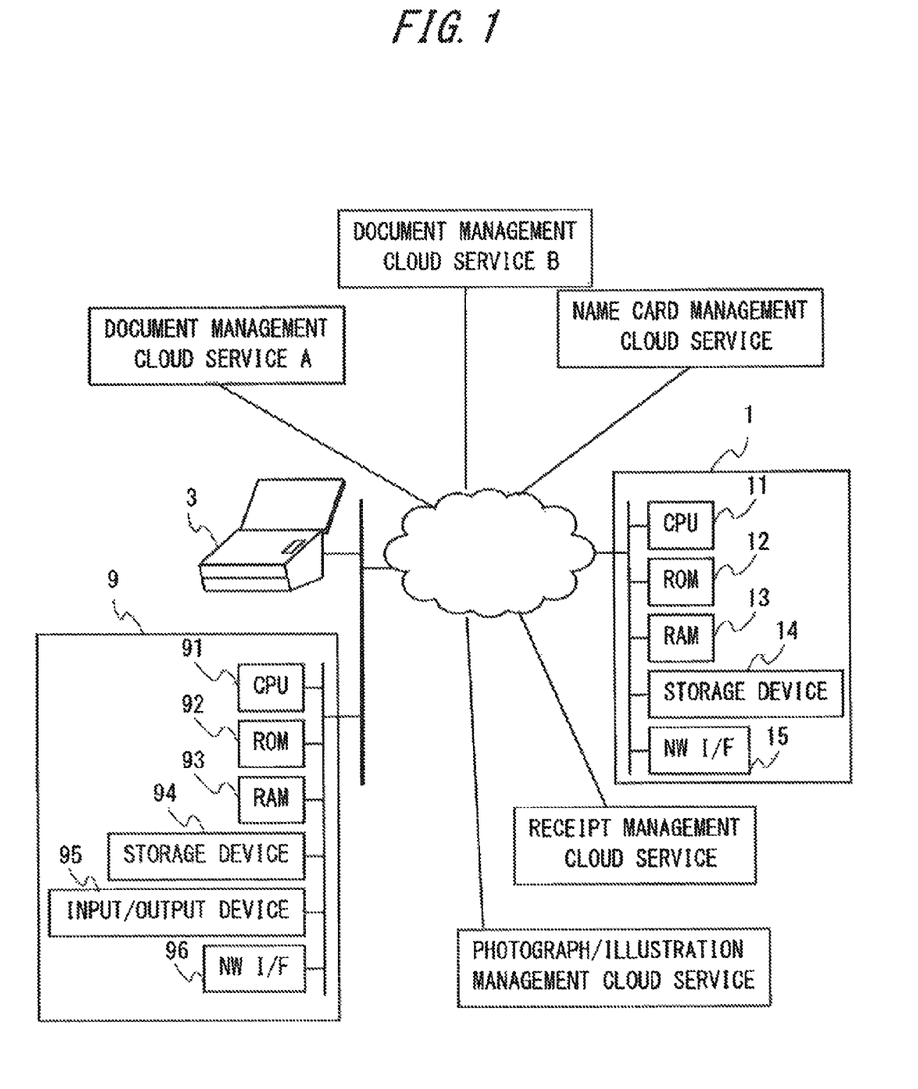
FIG. 1 is a schematic diagram showing a configuration of a system according to an embodiment.

FIG. 1 is a schematic diagram showing a configuration of a system 1 according to the present embodiment. The system 1 according to the present embodiment includes a scanner 3 and an image data processing server 1 which are connected via a network such as the Internet or a wide area network.

The image data processing server 1 is a computer including a central processing unit (CPU) 11, a read only memory (ROM) 12, a random access memory (RAM) 13, a storage device 14 that is an electrically erasable and programmable read only memory (EEPROM), an hard disk drive (HDD), or the like, a communicating unit 15, and the like. Moreover, while the image data processing server 1 is shown in the drawing to be a computer housed in a single case for the sake of simplicity, in the present embodiment, the image data processing server 1 provides an image data processing service to a user by having a part of or all of its functions executed by a device installed at a remote location or a plurality of devices installed in a distributed manner using cloud technology or the like. However, the configuration of the image data processing server 1 is not limited to the configuration exemplified in the present embodiment.

Figure 2:
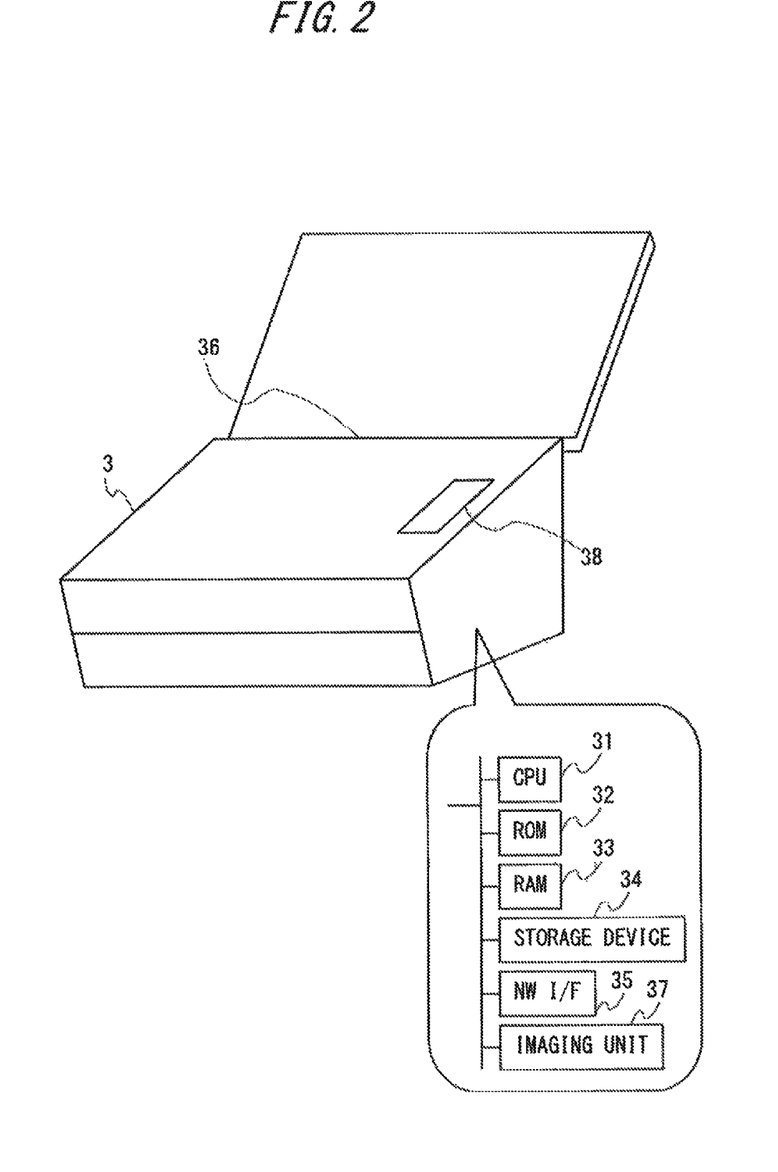
FIG. 2 is a diagram showing a hardware configuration of a scanner according to an embodiment.

FIG. 2 is a diagram showing a hardware configuration of the scanner 3 according to the present embodiment. The scanner 3 is a device which acquires image data by capturing an image of an original document such as a document, a name card, a receipt, and a photograph/illustration set by the user and is an imaging device including a sheet feeder 36 that feeds an original document to an imaging unit 37, the imaging unit 37, a scan button 38, a CPU 31, a ROM 32, a RAM 33, a storage device 34, a communicating unit 35, and the like. Moreover, while a scanner 3 adopting an image system in which images of an original document set in the sheet feeder 36 are captured while the original document is being automatically fed is exemplified in the present embodiment, the imaging system of a scanner is not restrictive. For example, a scanner of a type in which an image of an original document set at a reading position by the user may be used. In addition, while an example of using the scanner 3 as an imaging device to be used in the present system will be described in the present embodiment, the imaging device to be used in the present system is not limited to a scanner. For example, a camera may be adopted as the imaging device.

The scanner 3 according to the present embodiment is capable of connecting to a wireless LAN due to being provided with a wireless communication function. In addition, while the scanner 3 according to the present embodiment includes the scan button 38 that is pressed or touched by the user to instruct the scanner 3 to capture an image, the scanner 3 does not include a user interface that enables character input/output and item selection such as a touch panel display and a keyboard nor does the scanner 3 include a web browser function and a server function. However, communicating means, hardware configuration, and the like of a scanner capable of adopting the method according to the present embodiment is not limited to those exemplified in the present embodiment.

In addition, a user terminal 9 such as a so-called smartphone, a tablet, and a personal computer is connected to the system according to the present embodiment. The user terminal 9 is a computer including a CPU 91, a ROM 92, a RAM 93, a storage device 94, an input/output device 95, a communicating unit 96, and the like. As shown in FIG. 1, the user terminal 9 may communicate with the scanner 3 and the image data processing server 1 by being connected to a local network to which the scanner 3 is connected or may communicate with the scanner 3 and the image data processing server 1 by being connected to a mobile phone network.

Furthermore, an application for using the system according to the present embodiment has been downloaded to and installed in the user terminal 9 in advance. The application enables settings and the like to be made on the scanner 3 via the network. Therefore, a user interface that enables character input/output and item selection such as a touch panel display and a keyboard can be omitted from the scanner 3 according to the present embodiment. In addition, the application enables accounts to be created, login and logout to be performed, settings to be made, and the like on the image data processing server 1 via the network. As a result, with the system according to the present embodiment, by simply operating the user terminal 9 to complete preparations related to the entire system, setting an original document on the scanner 3, and operating the scan button 38, the user can transmit data obtained from the original document to an appropriate cloud service.

In addition, the image data processing server 1 and the user terminal 9 are capable of communicating with a plurality of cloud services (including services provided by third parties) on the Internet which provide various services to the user. Moreover, while hardware configurations of cloud services other than the image data processing server 1 are not illustrated in FIG. 1, each of the cloud services features computers with the same hardware configuration as the image data processing server 1 being installed in a distributed manner using cloud technology. While examples of these cloud services include a document management service, a name card management service, a receipt management service, and a photograph/illustration management service, cloud services that can be interlocked with the system 1 according to the present embodiment are not limited to those exemplified in the present disclosure.

Figure 3:
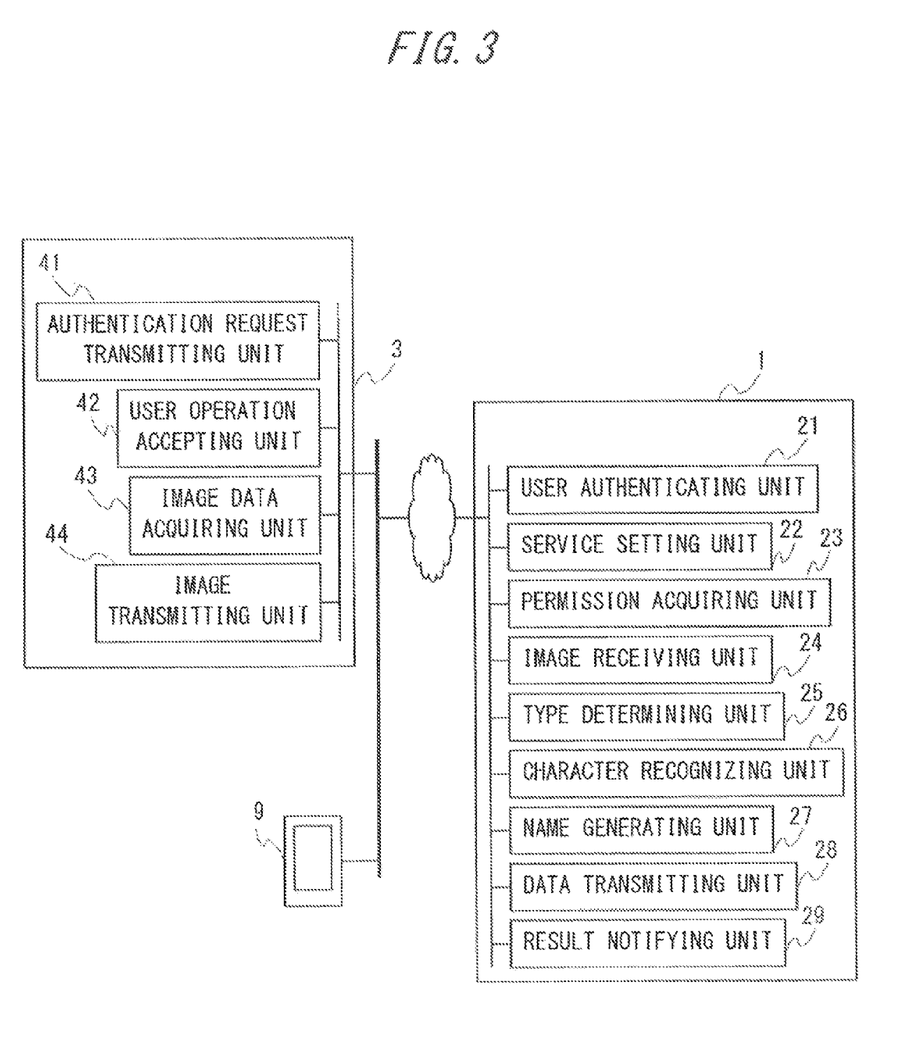
FIG. 3 is a diagram schematically showing a functional configuration of a system according to an embodiment.

FIG. 3 is a diagram schematically showing a functional configuration of the system according to the present embodiment. As respective hardware included in the image data processing server 1 are controlled by having a program recorded in the storage device 14 read by the RAM 13 and executed by the CPU 11, the image data processing server 1 functions as a device that includes a user authenticating unit 21, a service setting unit 22, a permission acquiring unit 23, an image receiving unit 24, a type determining unit 25, a character recognizing unit 26, a name generating unit 27, a data transmitting unit 28, and a result notifying unit 29. Moreover, in the present embodiment, the respective functions of the image data processing server 1 are executed by the CPU 11 that is a general purpose processor. Alternatively, a part of or all of the functions may be executed by one or a plurality of dedicated processors.

In response to an authentication request transmitted from the user terminal 9 or the scanner 3, the user authenticating unit 21 authenticates the user of the user terminal 9 or the scanner 3. The authentication request includes authentication information necessary for authentication. In the present embodiment, while a user ID and a password are used as authentication information, other information may be used as authentication information. Moreover, since the scanner 3 according to the present embodiment does not include a user interface that enables character input/output and item selection as described earlier, an authentication request is transmitted to the image data processing server 1 using authentication information, the notification of which is issued from the user terminal 9 to the scanner 3.

In the present embodiment, an access token (hereinafter, referred to as an "image data processing server access token" to distinguish the access token from a cloud service access token to be described later) is used to authenticate the user. Upon receiving an authentication request from the user terminal 9 or the scanner 3, the user authenticating unit 21 verifies authentication information included in the authentication request, and when the authentication information is appropriate, transmits an image data processing server access token to a transmission source of the authentication request (the user terminal 9 or the scanner 3). The user terminal 9 or the scanner 3 having received the image data processing server access token subsequently communicates with the image data processing server 1 using the image data processing server access token.

The service setting unit 22 sets a cloud service specified by the user as a transmission destination of image data and the like when the image data is of a predetermined type as a predetermined cloud service. In other words, with the image data processing server 1 according to the present embodiment, a data transmission destination cloud service in a case where image data is image data of a predetermined type can be set as a cloud service desired by the user. For example, when there are a plurality of document management services (for example, the document management service A and the document management service B shown in FIG. 1), by specifying a desired document management cloud service to the image data processing server 1 via an application that runs on the user terminal 9, the user can set a cloud service to be a transmission destination of data in a case where image data is document image data as a document management service that is specified by the user. This also applies to cloud services that manage data related to image data of other types or, in other words, to a name card management service, a receipt management service, and a photograph/illustration management service.

The permission acquiring unit 23 transmits an access permission request with respect to a predetermined cloud service in accordance with a request transmitted from the user-authenticated user terminal 9 and acquires access permission to a user account of the predetermined cloud service from the predetermined cloud service.

In the present embodiment, OAuth 2.0 authentication is used as means for receiving access permission from a cloud service and an access token (hereinafter, referred to as a "cloud service access token" to distinguish the access token from the image data processing server access token described earlier) is used as access permission. By transmitting an access permission request to each cloud service set by the service setting unit 22 among the cloud services that are interlocked with the present system, the image data processing server 1 receives an access token that is issued by each cloud service. The received access token for each cloud service is associated with an account of the user in the image data processing server 1 and saved in the image data processing server 1.

The image receiving unit 24 receives, via the network, image data which is acquired by and transmitted from the user-authenticated scanner 3.

The type determining unit 25 determines a type of the received image data. Moreover, in the present embodiment, the type that is determined by the type determining unit 25 includes at least any of a document, a name card, a receipt, and a photograph/illustration. However, the type of image data that can be determined by the type determining unit 25 is not limited to the types exemplified in the present embodiment.

The character recognizing unit 26 performs optical character recognition (OCR) on image data.

The name generating unit 27 generates a name of image data or data generated based on the image data, using a character string obtained as a result of optical character recognition. As the name of data, for example: when the determination by the type determining unit 25 reveals that the type of image data is a document, the name generating unit 27 generates a character string including a title and a creation date of the document; when the determination by the type determining unit 25 reveals that the type of image data is a name card, the name generating unit 27 generates a character string including a name and an organization name; and when the determination by the type determining unit 25 reveals that the type of image data is a receipt, the name generating unit 27 generates a character string including a store name and a received date.

When the type determining unit 25 determines that image data is of a predetermined type, the data transmitting unit 28 transmits the image data or data generated based on the image data (hereinafter, simply referred to as "data") to a user account of a predetermined cloud service. When transmitting data to the user account of the cloud service, an access token that is saved in the image data processing server 1 in association with an account of a user who has been authenticated by the user authenticating unit 21 as the user of the scanner 3 having transmitted the image data is used among the respective cloud service access tokens acquired from the respective cloud services by the permission acquiring unit 23.

Accordingly, when the type determining unit 25 determines that image data is document image data, the data transmitting unit 28 can transmit the image data or data generated based on the image data to a user account of a document management service specified by a user who has been authenticated as the user of the scanner 3 having transmitted the image data using an access token acquired from the document management service with respect the user.

The result notifying unit 29 notifies the user of a result (completion, failure, and the like) of data transmission by the data transmitting unit 28 by performing a release result notification.

As respective hardware included in the scanner 3 are controlled by having a program recorded in the storage device 34 read by the RAM 33 and executed by the CPU 31, the scanner 3 functions as a device that includes an authentication request transmitting unit 41, a user operation accepting unit 42, an image data acquiring unit 43, and an image transmitting unit 44. Moreover, in the present embodiment, the respective functions of the scanner 3 are executed by the CPU 31 that is a general purpose processor. Alternatively, a part of or all of the functions may be executed by one or a plurality of dedicated processors.

The authentication request transmitting unit 41 transmits, to the image data processing server 1, an authentication request including authentication information, the notification of which is issued from the user terminal 9 to the scanner 3.

The user operation accepting unit 42 accepts a predetermined user operation. In the present embodiment, as the predetermined user operation, pressing or touching the scan button 38 provided on the scanner 3 is accepted as a user operation for collectively instructing a series of processes from starting a scan to transmitting data to an appropriate cloud service. However, the predetermined user operation that triggers a scan to start is not limited to the example according to the present disclosure.

When the predetermined user operation is accepted by the user operation accepting unit 42, the image data acquiring unit 43 acquires image data by capturing an image of an object. Specifically, when an operation of the scan button 38 is accepted by the user operation accepting unit 42, the image data acquiring unit 43 of the scanner 3 according to the present embodiment acquires image data of an original document by controlling the sheet feeder 36 to send the original document to the imaging unit 37 and then controlling the imaging unit 37 to capture an image of the original document.

The image transmitting unit 44 transmits the image data acquired by the image data acquiring unit 43 to the image data processing server 1 via the network. In addition, transmission of image data by the image transmitting unit 44 is executed following the acquisition of the image data without involving operations other than the predetermined user operation (in the present embodiment, an operation of the scan button 38).

<Flow of Processes>

Next, a flow of processes executed by the system 1 according to the present embodiment will be described. It is to be understood that specific contents and a specific sequence of processes described below merely represent one example of implementing the present disclosure. Specific contents and sequences of the processes may be appropriately selected in accordance with embodiments of the present disclosure.

Figure 4:
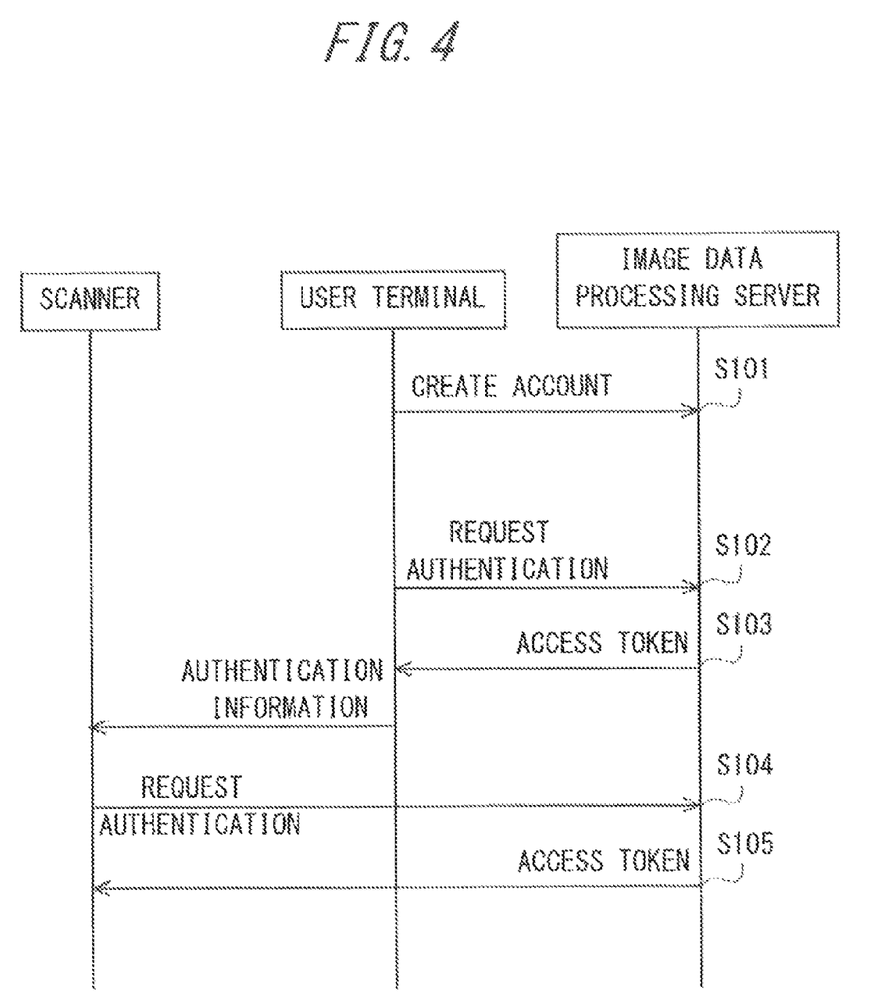
FIG. 4 is a sequence diagram showing an outline of a flow of an account creation/user authentication process according to an embodiment.

FIG. 4 is a sequence diagram showing an outline of a flow of an account creation/user authentication process according to the present embodiment.

In step S101, a user account is created. The user starts an application on the user terminal 9 that is a smartphone or the like. The started application prompts the user to input information (such as a user ID and a password) which is required to create an account and transmits the information input by the user to the image data processing server 1. The image data processing server 1 determines whether or not the information received from the user terminal 9 is appropriate, and when it is determined that the information is appropriate, creates an account of the user. In addition, the application saves authentication information (in the present embodiment, a user ID and a password) for logging into the created user account, in the user terminal 9.

In steps S102 and S103, a login process to the image data processing server 1 is performed by the user terminal 9. In response to an authentication request transmitted from the user terminal 9, the user authenticating unit 21 authenticates the user of the user terminal 9. Specifically, upon receiving an authentication request from the user terminal 9 (step S102), the user authenticating unit 21 verifies authentication information that is included in the authentication request, and when the authentication information is consistent with the account information created in step S101, the user authenticating unit 21 transmits an image data processing server access token to the user terminal 9 that is a transmission source of the authentication request (step S103). The user terminal 9 having received the image data processing server access token subsequently communicates with the image data processing server 1 using the received access token.

In addition, after creating an account in the image data processing server 1, the user starts an application on the user terminal 9 and causes the user terminal 9 to be connected to the scanner 3 via a wireless network. Furthermore, the application notifies the scanner 3 of the authentication information which is created in step S101 and saved in the user terminal 9 and which is used to log into the image data processing server 1. The authentication request transmitting unit 41 of the scanner 3 having received the notification of the authentication information transmits an authentication request including the authentication information to the image data processing server 1.

In steps S104 and S105, a login process to the image data processing server 1 is performed by the scanner 3. When the authentication request transmitted by the scanner 3 is received by the image data processing server 1 (step S104), the user authenticating unit 21 of the image data processing server 1 authenticates the user of the scanner 3. The user authenticating unit 21 verifies the authentication information included in the authentication request that is received from the scanner 3, and when the authentication information is consistent with the account information created in step S101, the user authenticating unit 21 transmits an image data processing server access token to the scanner 3 that is a transmission source of the authentication request (step S105). The scanner 3 having received the image data processing server access token subsequently communicates with the image data processing server 1 using the received access token.

Figure 5:
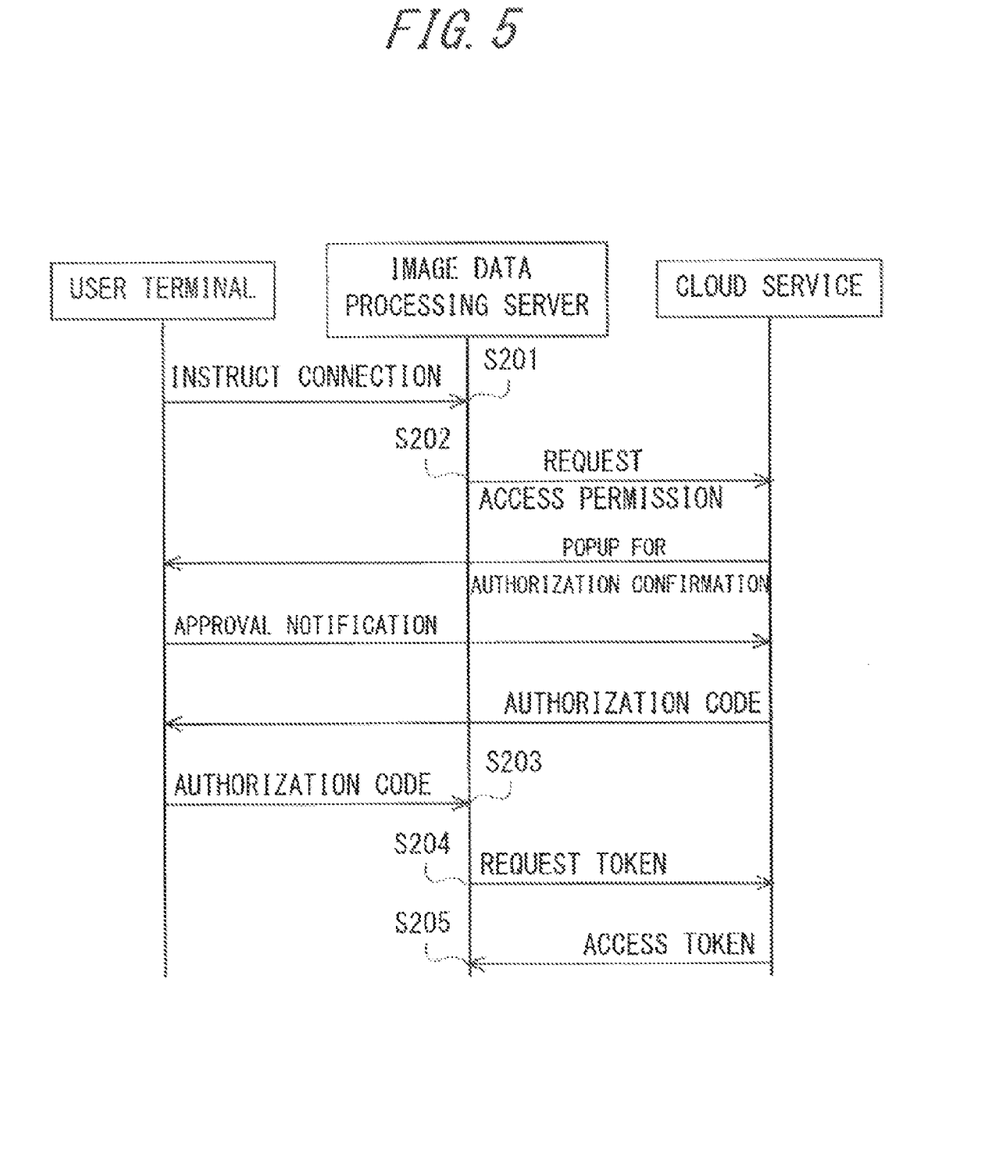
FIG. 5 is a sequence diagram showing an outline of a flow of a permission acquisition process according to an embodiment.

FIG. 5 is a sequence diagram showing an outline of a flow of a permission acquisition process according to the present embodiment. Execution of the permission acquisition process according to the present embodiment is triggered by the start of an application for using the system according to the present embodiment by the user. Moreover, while OAuth 2.0 authentication is used as means for receiving access permission from a cloud service in the present embodiment, other means may alternatively be used for the authentication.

In steps S201 and S202, an access permission request with respect to the cloud service is performed. By starting the application on the user terminal 9 and operating an agent of the application, the user connects the user terminal 9 to a website provided by the image data processing server 1. Moreover, while a web browser that is implemented in the application is used in the present embodiment, other web browsers that are installed in the user terminal 9 may alternatively be used to connect to the website provided by the image data processing server 1.

Subsequently, when the website of the image data processing server 1 receives an instruction to connect to the cloud service which is issued by the user via the web browser (step S201), the permission acquiring unit 23 of the image data processing server 1 transmits an access permission request to the cloud service (step S202). The access permission request represents a request made by the image data processing server 1 for using an account of the user of each cloud service. Moreover, the user account of each cloud service may be set in advance by the user or may be newly created via the application. As described earlier with reference to the service setting unit 22 and the permission acquiring unit 23, the user can specify a desired cloud service for each type of image data, in which case the permission acquiring unit 23 transmits an access permission request to a cloud service that is specified by the user.

The cloud service having received the access permission request displays a popup for authorization confirmation on the user terminal 9. Subsequently, when the user having confirmed the displayed popup performs an operation for approving (granting) the use of the account of the user of the cloud service related to the popup by the image data processing server 1, the cloud service is notified of the approval by the user, from the web browser.

In step S203, the cloud service having received the notification of the user's approval provides an authorization code to the image data processing server 1 via the web browser of the user terminal 9. The permission acquiring unit 23 of the image data processing server 1 receives, via the user terminal 9, the authorization code transmitted by the cloud service. Subsequently, the process proceeds to step S204.

In steps S204 and S205, a cloud service access token is acquired. The permission acquiring unit 23 of the image data processing server 1 transmits an access token request including the authorization code to the cloud service (step S204) and acquires an access token from the cloud service in exchange for the authorization code (step S205). The acquired access token for each cloud service is associated with an account of the user in the image data processing server 1 and saved in the image data processing server 1. Subsequently, the process shown in the present sequence diagram is finished.

As a result of the processes shown in FIGS. 4 and 5 described above, an access token for the image data processing server 1 is acquired by the scanner 3, an access token for the cloud service is acquired by the image data processing server 1, and user accounts thereof are associated with each other. Therefore, with the system according to the present embodiment, a transmission (release) of scan data from the scanner 3 to the cloud service via the image data processing server 1 can be performed as will be described later with reference to FIG. 6.

Figure 6:
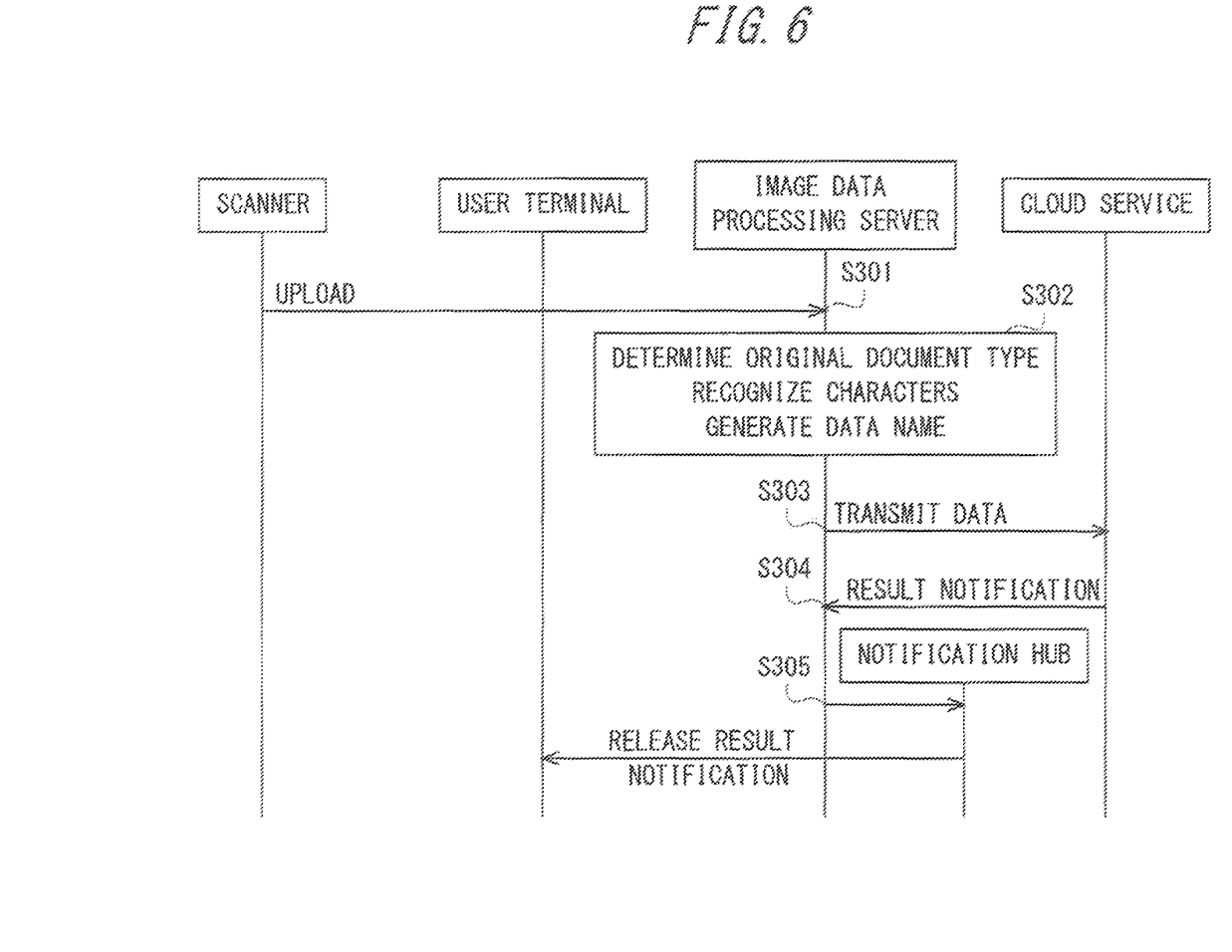
FIG. 6 is a sequence diagram showing an outline of a flow of an image data process according to an embodiment.

FIG. 6 is a sequence diagram showing an outline of a flow of an image data process according to the present embodiment. Execution of the image data process according to the present embodiment is triggered by the mounting of an original document on the scanner 3 and the user operating the scan button 38 of the scanner 3.

In step S301, scanned image data is uploaded to the image data processing server 1. When an operation of the scan button 38 is accepted by the user operation accepting unit 42 of the scanner 3, the image data acquiring unit 43 acquires image data of the original document by sending the original document to the imaging unit 37 using the sheet feeder 36 and causing the imaging unit 37 to capture an image of the original document. In addition, the image transmitting unit 44 of the scanner 3 transmits the acquired image data to the image data processing server 1. In this case, the image data processing server access token acquired in advance in step S105 is used for the transmission.

In addition, transmission of image data by the image transmitting unit 44 in the present embodiment is executed following the acquisition of the image data without involving user operations other than an operation of the scan button 38. The image receiving unit 24 of the image data processing server 1 receives image data transmitted from the scanner 3. In addition, by inspecting an access token that is received together with the image data, the image receiving unit 24 confirms whether or not the received image data has been transmitted from a user-authenticated scanner 3. When the received image data has not been received from a user-authenticated scanner 3, the process shown in the present sequence diagram is finished (not illustrated). On the other hand, when the received image data has been received from a user-authenticated scanner 3, the process proceeds to step S302.

In step S302, automatic discrimination of original document type is performed. The type determining unit 25 determines whether the received image data is image data related to any type of a document, a name card, a receipt, and a photograph/illustration. While a determination system based on image characteristics such as layout recognition, character recognition, and color recognition can be used to determine the type, the determination system is not limited to the example described in the present disclosure and various techniques including known techniques as well as techniques to be developed in the future can be adopted to determine the type.

In addition, the character recognizing unit 26 performs optical character recognition (OCR) on the image data. Furthermore, the name generating unit 27 generates a name of image data or data generated based on the image data, using a character string acquired as a result of the optical character recognition. A specific method of name generation is as described earlier. Moreover, the image data is not limited to a data format received from the scanner and may be converted into a format suitable for the determined original document type such as Portable Document Format (PDF). Subsequently, the process proceeds to step S303.

In step S303, a cloud service corresponding to the original document type is identified and data is transmitted to the concerned cloud service. The data transmitting unit 28 transmits the image data or data generated based on the image data and a generated name in accordance with the original document type determined in step S302 to a user account of the cloud service corresponding to the original document type. For the transmission of data to the user account of the cloud service, each cloud service access token which has been acquired in step S205 and which is saved in association with the user account of the image data processing server 1 is used. Subsequently, the process proceeds to step S304.

In steps S304 and S305, a release result is transmitted. When data transmission by the data transmitting unit 28 is completed and a result notification is received from the cloud service that is a transmission destination (step S304), the result notifying unit 29 of the image data processing server 1 notifies the user of completion, failure, or the like of the data transmission by performing a release result notification (step S305). Specifically, the result notifying unit 29 notifies a notification function or an application provided in the user terminal 9 as a standard feature that data has been transmitted to a predetermined cloud service and is saved in the cloud service via a predetermined notification hub service (for example, the Azure notification hub) which enables a push notification to be issued to the user terminal 9. However, other techniques may be adopted in order to issue the result notification. Subsequently, the process shown in the present sequence diagram is finished.

<Advantageous Effects>

As described above, in the system described in the present embodiment, the scanner 3 is already logged into the image data processing server 1, and a plurality of tokens issued by cloud services are received by the image data processing server 1 and managed in association with users of the scanner 3 and the user terminal 9 which have been authenticated by the image data processing server 1. Therefore, by being configured as described above, the system according to the present embodiment enables reception of image data by the image receiving unit 24, determination of a type by the type determining unit 25, and transmission of the image data or data generated based on the image data by the data transmitting unit 28 to be consecutively executed without involving confirmation by a user, and realizes a system in which a series of processes from start of a scan to completion of transmission of data to an appropriate cloud service without having to specify a cloud service that is a transmission destination is completed by a single operation (one push or one touch of the scan button 38).

What is claimed is:
1. An image data processing server comprising:
a user authenticating unit to authenticate a user of an imaging device;
a permission acquiring unit to acquire, from a predetermined service that provides the service via a network, access permission to an account of the user in the predetermined service;
an image receiving unit to receive, via a network, image data which is transmitted from and acquired by the imaging device which is user-authenticated;
a type determining unit to determine a type of the received image data; and a data transmitting unit to transmit, when it is determined by the type determining unit that the image data is image data of a predetermined type, the image data or data generated based on the image data to the account of the user in the predetermined service, using the access permission acquired from the predetermined service with respect to a user who has been authenticated as the user of the imaging device that has transmitted the image data, wherein the permission acquiring unit acquires, from a first service that provides a service via a network, access permission to an account of the user in the first service and acquires, from a second service that provides a service via a network, access permission to an account of the user in the second service, and when the type determining unit determines that the image data is image data of a first type, the data transmitting unit uses the access permission acquired from the first service with respect to a user authenticated as a user of the imaging device having transmitted the image data to transmit the image data or data generated based on the image data to the account of the user in the first service, and when the type determining unit determines that the image data is image data of a second type, the data transmitting unit uses the access permission acquired from the second service with respect to a user authenticated as a user of the imaging device having transmitted the image data to transmit the image data or data generated based on the image data to the account of the user in the second service; and wherein the user authenticating unit, the permission acquiring unit, the image receiving unit, the type determining unit, and the data transmitting unit are at least executed by a processor.

2. The image data processing server according to claim 1, wherein
the user authenticating unit further authenticates a user of a user terminal, and
the permission acquiring unit transmits an access permission request to the predetermined service and acquires the access permission in accordance with a request that is transmitted from the user terminal which is user-authenticated.

3. The image data processing server according to claim 1, further comprising a result notifying unit to notify the user of a result of data transmission by the data transmitting unit.

4. The image data processing server according to claim 1, further comprising:
a character recognizing unit to perform optical character recognition on the image data; and
a name generating unit to generate a name of the image data or data generated based on the image data, using a character string that is acquired as a result of the optical character recognition.

5. The image data processing server according to claim 1, wherein
the type that is determined by the type determining unit includes at least any of a document, a name card, a receipt, and a photograph/illustration.

6. The image data processing server according to claim 1, further comprising a service setting unit to set, as the predetermined service, a service specified by the user as a transmission destination of image data when the image data is image data of the predetermined type.

7. The image data processing server according to claim 1, further comprising a service setting unit to set, as the first service, a service specified by the user as a data transmission destination when the image data is image data of the first type, and for setting, as the second service, a service specified by the user as a data transmission destination when the image data is image data of the second type.

8. The image data processing server according to claim 1, wherein the user authenticating unit authenticates a user of the imaging device in response to an authentication request which is transmitted by the imaging device and which includes authentication information, the notification of which is issued from a user terminal to the imaging device.

9. A system comprising:
an imaging device; and
an image data processing server,
wherein the image data processing server includes:
a user authenticating unit to authenticate a user of the imaging device;
a permission acquiring unit to acquire, from a predetermined service that provides the service via a network, access permission to an account of the user in the predetermined service;
an image receiving unit to receive, via a network, image data which is transmitted from and acquired by the imaging device which is user-authenticated;
a type determining unit to determine a type of the received image data; and a data transmitting unit to transmit, when it is determined by the type determining unit that the image data is image data of a predetermined type, the image data or data generated based on the image data to the account of the user in the predetermined service, using the access permission acquired from the predetermined service with respect to a user who has been authenticated as the user of the imaging device that has transmitted the image data, and the imaging device includes:
an authentication request transmitting unit to transmit, to the image data processing server, an authentication request including authentication information, a notification of which is issued from a user terminal to the imaging device;
a user operation accepting unit to accept a predetermined user operation;
an image data acquiring unit to acquire image data by capturing an image of an object when the predetermined user operation is accepted by the user operation accepting unit; and
an image transmitting unit to transmit the image data acquired by the image data acquiring unit to the image data processing server via the network, and wherein the permission acquiring unit acquires, from a first service that provides a service via a network, access permission to an account of the user in the first service and acquires, from a second service that provides a service via a network, access permission to an account of the user in the second service, and when the type determining unit determines that the image data is image data of a first type, the data transmitting unit uses the access permission acquired from the first service with respect to a user authenticated as a user of the imaging device having transmitted the image data to transmit the image data or data generated based on the image data to the account of the user in the first service, and when the type determining unit determines that the image data is image data of a second type, the data transmitting unit uses the access permission acquired from the second service with respect to a user authenticated as a user of the imaging device having transmitted the image data to transmit the image data or data generated based on the image data to the account of the user in the second service, and wherein the user authenticating unit, the permission acquiring unit, the image receiving unit, the type determining unit, the authentication request transmitting unit, the user operation accepting unit, the image data acquiring unit and the data transmitting unit are executed by one or plurality of processors.

10. The system according to claim 9, wherein
the transmission of image data by the image transmitting unit is consecutively executed after the acquisition of the image data without involving operations other than the predetermined user operation, and reception of the image data by the image receiving unit, determination of a type by the type determining unit, and transmission of the image data or data generated based on the image data by the data transmitting unit are consecutively executed without involving confirmation by the user.

11. An image data processing method that causes a computer to execute: authenticating a user of an imaging device; acquiring, from a predetermined service that provides the service via a network, access permission to an account of the user in the predetermined service; receiving, via a network, image data which is transmitted from and acquired by the imaging device which is user-authenticated; determining a type of the received image data; and transmitting, when it is determined in the type determination that the image data is image data of a predetermined type, the image data or data generated based on the image data to the account of the user in the predetermined service, using the access permission acquired from the predetermined service with respect to a user who has been authenticated as the user of the imaging device that has transmitted the image data, wherein acquires, from a first service that provides a service via a network, access permission to an account of the user in the first service and acquires, from a second service that provides a service via a network, access permission to an account of the user in the second service, and when determines that the image data is image data of a first type, uses the access permission acquired from the first service with respect to a user authenticated as a user of the imaging device having transmitted the image data to transmit the image data or data generated based on the image data to the account of the user in the first service, and when determines that the image data is image data of a second type, uses the access permission acquired from the second service with respect to a user authenticated as a user of the imaging device having transmitted the image data to transmit the image data or data generated based on the image data to the account of the user in the second service.

* * * * *